United States Patent
Wadle et al.

(10) Patent No.: US 7,466,032 B2
(45) Date of Patent: Dec. 16, 2008

(54) POWER FROM A NON-ANIMAL ORGANISM

(75) Inventors: Gordon W. Wadle, Thomson, IL (US); Kris J. Lagadinos, Brookline, MA (US)

(73) Assignee: WHLK, LLC

( * ) Notice: Subject to any disclaimer, the term of this patent is extended or adjusted under 35 U.S.C. 154(b) by 523 days.

(21) Appl. No.: 11/302,709

(22) Filed: Dec. 13, 2005

(65) Prior Publication Data
US 2007/0282384 A1    Dec. 6, 2007

(51) Int. Cl.
*H05F 7/00* (2006.01)
(52) U.S. Cl. .................... 290/1 R; 290/1 A
(58) Field of Classification Search ............... 290/1 R, 290/2 A; 322/2 R, 2 A
See application file for complete search history.

(56) References Cited

U.S. PATENT DOCUMENTS

| | | | |
|---|---|---|---|
| 3,822,505 A | 7/1974 | Levengood | 47/1.3 |
| 4,177,603 A | 12/1979 | Dykes | 47/1.3 |
| 4,206,396 A * | 6/1980 | Marks | 322/2 A |
| 4,494,009 A * | 1/1985 | Yukl | 290/55 |
| 5,052,628 A | 10/1991 | Wainwright et al. | 239/690 |
| 5,288,626 A | 2/1994 | Levengood | 435/172.3 |
| 6,310,406 B1 * | 10/2001 | Van Berkel | 290/43 |
| 6,473,641 B1 | 10/2002 | Kodama et al. | 600/547 |
| 7,161,362 B2 | 1/2007 | Shambroom et al. | 324/692 |

FOREIGN PATENT DOCUMENTS

| | | |
|---|---|---|
| EP | 0 039 163 A1 | 11/1981 |
| EP | 0 459 540 A1 | 12/1991 |
| JP | 11-47279 | 2/1999 |
| JP | 2001-87241 | 4/2001 |
| JP | 2003-284697 | 10/2003 |
| WO | WO 2005/065544 A1 | 7/2005 |

OTHER PUBLICATIONS

Bateman, M., "Camex-3 Lightning Instrument Package (LIP)", 2005, http://ghrc.msfc.nasa.gov/uso/readme/er2lip.html, 5 pages.
Blakeslee, R., "Camex-3 Instruments", CAMEX-3 Lightning Instrument Package (LIP), 2001, http://ghrc.msfc.nasa.gov/camex3/instruments/lip.html, 3 pages.
Campbell, J., "Electric Filed Mill Fabrication", 2001, http://www.precisionstrobe.com/jc/fieldmill/fieldmill.html, 5 pages.
"Electric Filed Mills", 1999, http://www.aero.org/publications/crosslink/summer2001/05_sidebar3.html, one page.

(Continued)

*Primary Examiner*—Nicholas Ponomarenko
(74) *Attorney, Agent, or Firm*—Mintz, Levin, Cohn, Ferris, Glovsky and Popeo, P.C.

(57) ABSTRACT

A system includes a non-animal organism, a first electrical conductor electrically coupled to the non-animal organism, a second electrical conductor coupled to a ground, and an electrical load coupled between the first electrical conductor and the second electrical conductor to draw electricity from the non-animal organism, the electrical load being configured to operate using electricity drawn from the non-animal organism.

28 Claims, 7 Drawing Sheets

OTHER PUBLICATIONS

Chun et al., "Microfluidic analysis of electrokinetic streaming potential induced by microflows of monovalent electrolyte solution", *J. Micromech. Microeng.*, 15:710-719 (2005).

Garrido, J., "Observable streaming potential in membranes", *J. Electrochem. Soc.*, 150(11):E567-E570 (2003).

Koppán et al., "Measurement of electric potential difference on trees", *Proceedings of the 7th Hungarian Congress on Plant Physiology*, 46(3-4):37-38 (2002).

Science Service, Intel STS Results, "59th Annual STS (1999-2000) Finalists—Brian David Hemond", http://www.sciserv.org/sts/59sts/Hemond.asp, one page (Jan. 3, 2007).

Yang et al., "Electrokinetic microchannel battery by means of electrokinetic and microfluidic phenomena", *J. Micromech. Microeng.*, 13:963-970 (2003).

Mahler, P. *Nature's Electricity*, Tree of Knowledge (Hog Kong) Ltd., Scientific Experiment Kits, pp. 1-20 (2003).

Nelson, R. *Hemp Husbadry*, Internet Edition, Chapter 5, Electro-Culture (2000), http://www.rexresearch.com/hhusb/hh5elc.htm.

Fensom, D.S., "The Bioelectric Potentials of Plants and Their Functional Significance: V. Some Daily and Seasonal Changes in the Electrical Potential and Resistance of Living Trees", *Can. J. Bot.*, Abstract only, 41(6):831-851, (1963).

Gensler et al., "Investigation of the Causative Reactant of the Apoplast Electropotentials of Plants", *J. Electrochem. Soc.: Electrochem. Sci. Tech.*, 135(12):2991-2995 (1988).

Gensler, W., "An Electrochemical Instrumentation System for Agriculture and the Plant Sciences", *J. Electrochem. Soc.: Electrochem. Sci. Tech.*, 127(11):2365-2370 (1980).

Koppan et al., "Annual Fluctuation in Amplitudes of Daily Variations of Electrical Signals Measured in the Trunk of a Standing Tree", *Life Sci.*, 323:559-563 (2000).

Ksenzhek et al., "Electrical Properties of Plant Tissues. Resistance of a Maize Leaf", *Bulg. J. Plant Physiol.*, 30(3-4):61-67 (2004).

Labady et al., "Plant Bioelectrochemistry: Effects of CCCP on Electrical Signaling in Soybean", *Bioelectrochem.*, 57:47-53 (2002).

Lanzerotti, L.J., "Telluric Currents: The Natural Environment and Interactions with Man-Made Systems", http://www.nap.edu/openbook/0309036801/html/232.html, Chapter 16, pp. 232-257 (2000).

Levengood, W.C., "Bioelectric Currents and Oxidant Levels in Plant Systems", *J. Exper. Botany*, 24(81):626-639 (1973).

Niklas et al., "Invariant Scaling Relationships for Interspecific Plant Biomass Production Rates and Body Size", *PNAS*, 98(5):2922-2927 (2001).

Silva-Diaz et al., "In Vivo Cyclic Voltammetry in Cotton Under Field Conditions", *J. Electrochem. Soc.: Electrochem. Sci. Tech.*, 130(7):1464-1468 (1983).

Wegner et al., "Simultaneous Recording of Xylem Pressure and Trans-Root Potential in Roots of Intact Glycophytes Using a Novel Xylem Pressure Probe Technique", *Plant, Cell Environ.*, 21:849-865 (1998).

Wright et al., "Measurement of the Sieve Tube Membrane Potential", *Plant Physiol.*, 67:845-848 (1981).

Scientifics, 1977 Annual Science Reference Catalog, C971A, Edmund Scientific Co., Barrington, NJ, p. 71, "Potato Power—The Clock Idea of the Tear".

\* cited by examiner

POWER FROM A NON-ANIMAL ORGANISM

BACKGROUND

Since the late-nineteenth century the use of, and uses for, electricity has increased tremendously, becoming a fundamental part of everyday life for most people. One only has to look at remote parts of the world to see how drastically different life is without electricity. Most electric devices in use today typically draw between a few milliwatts to several megawatts of power, depending on the application. Higher costs for the fuels needed to generate electricity, and a higher electrical demand in general, however, have led to increased electricity costs, thereby increasing the attractiveness of alternative power sources.

One typical use of electricity is a light emitting diode (LED). LEDs have seen increasing popularity in recent times due to a lower per unit cost and a greater number of available colors. LEDs are more energy efficient (i.e., less power is consumed) and generally have a much longer life expectancy than conventional filament-based light bulbs. In general, LEDs draw approximately 20 mA at 2V (i.e., 40 mW) when illuminated, which is far less than conventional light bulbs.

Distribution of electricity from a generation plant to the end-user is not a trivial problem. Thousands of miles of wires and cables creating a transmission network are involved in delivering power to consumers. The transmission network adds costs such as material costs and the cost of lost energy due to the resistance of the transmission wires. For the average consumer of electricity, the transmission costs generally equal the cost of the electricity itself. Furthermore, portions of the world have no electricity because it is simply too far from the nearest transmission line or the terrain itself prohibits installation of transmission lines.

SUMMARY

In general, in an aspect, the invention provides a system including a non-animal organism, a first electrical conductor electrically coupled to the non-animal organism, a second electrical conductor coupled to a ground, and an electrical load coupled between the first electrical conductor and the second electrical conductor to draw electricity from the non-animal organism, the electrical load being configured to operate using electricity drawn from the non-animal organism.

Implementations of the invention may include one or more of the following features. The charging circuit is coupled to the electrical load, and includes an energy storage device, the charging circuit stores energy drawn from the non-animal organism and provides the energy to the electrical load. The electrical storage device is a capacitor. The electrical storage device is a battery. The apparatus further includes a filter circuit configured to filter the electricity drawn from the non-animal organism to produce filtered electricity, and to provide the filtered electricity to the charging circuit. The apparatus further includes a filter circuit configured to filter the electricity drawn from the non-animal organism to produce filtered electricity, and to provide the filtered electricity to the electrical load.

Also, implementations of the invention may include one or more of the following features. The non-animal organism is a member of the plant kingdom. The non-animal organism is a tree. The non-animal organism is a member of the fungi kingdom. The first electrical conductor is a configured to be inserted into the non-animal organism. The first electrical conductor is configured to be inserted into the non-animal organism to a depth of from about 0.25 inches to about 0.75 inches. The first electrical conductor may be stainless steel. The first electrical conductor may be aluminum. The first electrical conductor comprises a plurality of electrically conductive taps coupled to the non-animal organism. The non-animal organism comprises a single tree. The non-animal organism comprises multiple trees.

In general, in another aspect, the invention provides a method for drawing electricity from a non-animal organism including coupling a first electrical conductor to the non-animal organism, coupling a second electrical conductor to a ground, coupling an electrical load between the first electrical conductor and the second electrical conductor, the electrical load being configured to draw electricity from the non-animal organism via the first electrical conductor, and operating the electrical load using electricity drawn from the non-animal organism.

Implementations of the invention may include one or more of the following features. The method further includes storing energy drawn from the non-animal organism in an electrical storage device, and providing the stored energy to the electrical load. Providing the stored energy includes intermittently providing power to the electrical load. The method further includes filtering power drawn from the non-animal organism into substantially DC power, and providing the filtered substantially DC power to the electrical storage device. The method further includes filtering power drawn from the non-animal organism into substantially DC power, and providing the filtered substantially DC power to the electrical load. Coupling the first electrical conductor includes coupling the first electrical conductor to a living member of the plant kingdom. Coupling the first electrical conductor includes coupling the first electrical conductor to a living tree. Coupling the first electrical conductor includes coupling the first electrical conductor to a living member of the fungi kingdom. Coupling the first electrical conductor includes coupling a plurality of electrically conductive taps to a single living plant or a single living fungus. Coupling the first electrical conductor includes coupling a plurality of electrically conductive taps to multiple separate living non-animal organisms, each non-animal organism being a plant or a fungus. The method further includes operating a light emitting diode using the electricity drawn from the non-animal organism.

Various aspects of the invention may provide one or more of the following capabilities. A non-animal organism, such as a member of the plant and/or fungi kingdom, may supply electricity to a load. Electricity may be available in remote areas without an electricity transmission network. Alternative "clean" electricity can be produced. An LED may be powered from a non-animal organism. Infra-red LEDs used in military operations may be powered. A traffic light may be powered from a non-animal organism. A security light may be powered from a non-animal organism. Dependence on fossil fuels to generate electricity may be reduced. Lighting may be provided at campgrounds and/or ski areas using power provided from non-animal organisms. Power derived from non-animal organisms may be used to recharge batteries in hybrid vehicles.

These and other capabilities of the invention, along with the invention itself, will be more fully understood after a review of the following figures, detailed description, and claims.

DETAILED DESCRIPTION

Embodiments of the invention provide techniques for drawing electricity from non-animal organisms such as members of the plant and/or fungi kingdom, and providing the electricity to a load. Non-animal, non-mammal organisms such as spermatophytes, pteridophytes, succulents, Marattiales ferns, Ophioglossales ferns, Leptosporangiate ferns, Mycophycota fungi, Zygomycota fungi, Basidiomycota fungi, and Ascomycota fungi may be used. Specifically, electricity can be drawn from vegetative matter such as a living tree. The amount of available electricity has been found to depend on the location and type of non-animal organism, and to be approximately 0.5-2 volts DC, plus some AC current. For example, an apparatus for using this energy includes a conductor inserted into a tree and connected to a positive terminal of a load. A negative conductor of the load is connected to a grounded conductor, thereby completing a circuit. Other circuitry, such as charging circuits and/or voltage step-up circuits, may also be used. Other embodiments are within the scope of the invention.

Figure 1:
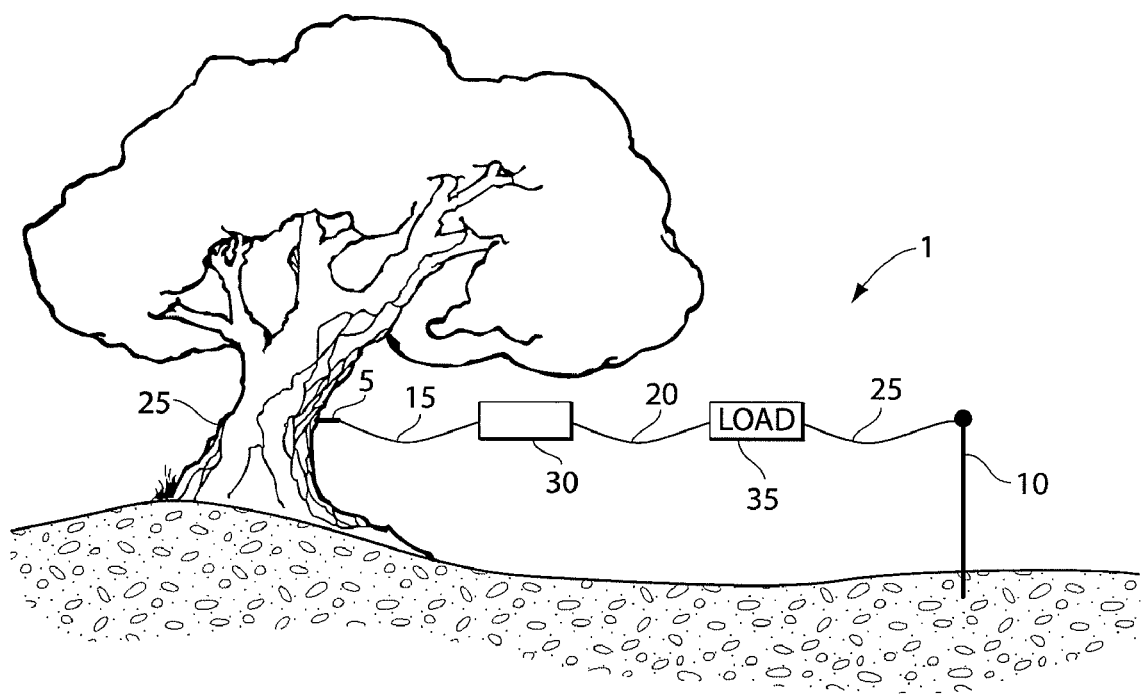
FIG. 1 is a diagram of an apparatus for drawing power from a tree.

Referring to FIG. 1, an apparatus 1 for deriving electricity from a tree 25 includes a tap 5, a conductor 10, wires 15, 20, and 25, a circuit 30, and a load 35. The tap 5 is configured to attach to, and to conduct current flow from, the tree 25. For example, the tap 5 may be configured to be inserted into the tree 25, although other configurations are possible (e.g., a non-invasive transformer core that surrounds the circumference of the tree 25). The wire 15 is electrically coupled to the tap 5 and the circuit 30. The wire 20 is electrically coupled to the circuit 30 and the load 35. The wire 25 is electrically coupled to the load 35 and the conductor 10. The conductor 10 is electrically conductive and is configured to be inserted approximately two feet into the ground while protruding above the ground, although the conductor 10 may be configured to be inserted to other depths. The conductor 10 is preferably a tinned copper rod. Other materials and/or configurations of the conductor 10 are possible. For example the conductor 10 may be aluminum and/or connected to a "ground" connection of a typical household electrical system. The circuit 30 is electrically conductive and is configured to filter the power provided by the tree, to step-up (or step-down) the voltage supplied by the tree 25, and/or to store the power provided by the tree 25. The circuit 30 may perform functions other than those listed above. Also, embodiments of the apparatus 1 without the circuit 30 are possible (e.g., connecting a load directly between the tree 25 and the conductor 10).

Various embodiments of the tap 5 are possible. Preferably, the tap 5 is a stainless steel rod, e.g., a nail, having an outside diameter of about 0.125 inches, but other materials and sizes are possible. For example, brass plated or aluminum rods having an outside diameter of about 0.06 inches may be used. The tap 5 is electrically conductive material and is preferably of a material (e.g., stainless steel) that has a relatively high corrosion resistance, thus inhibiting increased resistance caused by corrosion. For extended use, the tap 5 is preferably not copper (at least on its exterior) as this can negatively affect (e.g., kill) many types of trees. The tap 5 is preferably configured to be inserted between about 0.375 inches and about 0.75 inches into the tree 25, although other depths are possible. In trees with thick bark, the tap 5 may be inserted further into the tree 25. For example, if a tree has bark 1 inch thick, the tap 5 may be inserted about 1.5 inches into the tree 25. The tap 5 is preferably inserted into the tree 25 between about one and about six feet above ground level, although other heights may be used. While the apparatus 1 includes the one tap 5, multiple taps may be used. Using multiple taps in a single tree has been found to increase the amount of current available from the tree. The taps may all be the same, or one or more taps may be different (e.g., a different material, configured for different insertion depth, etc.) than another tap.

Figure 2:
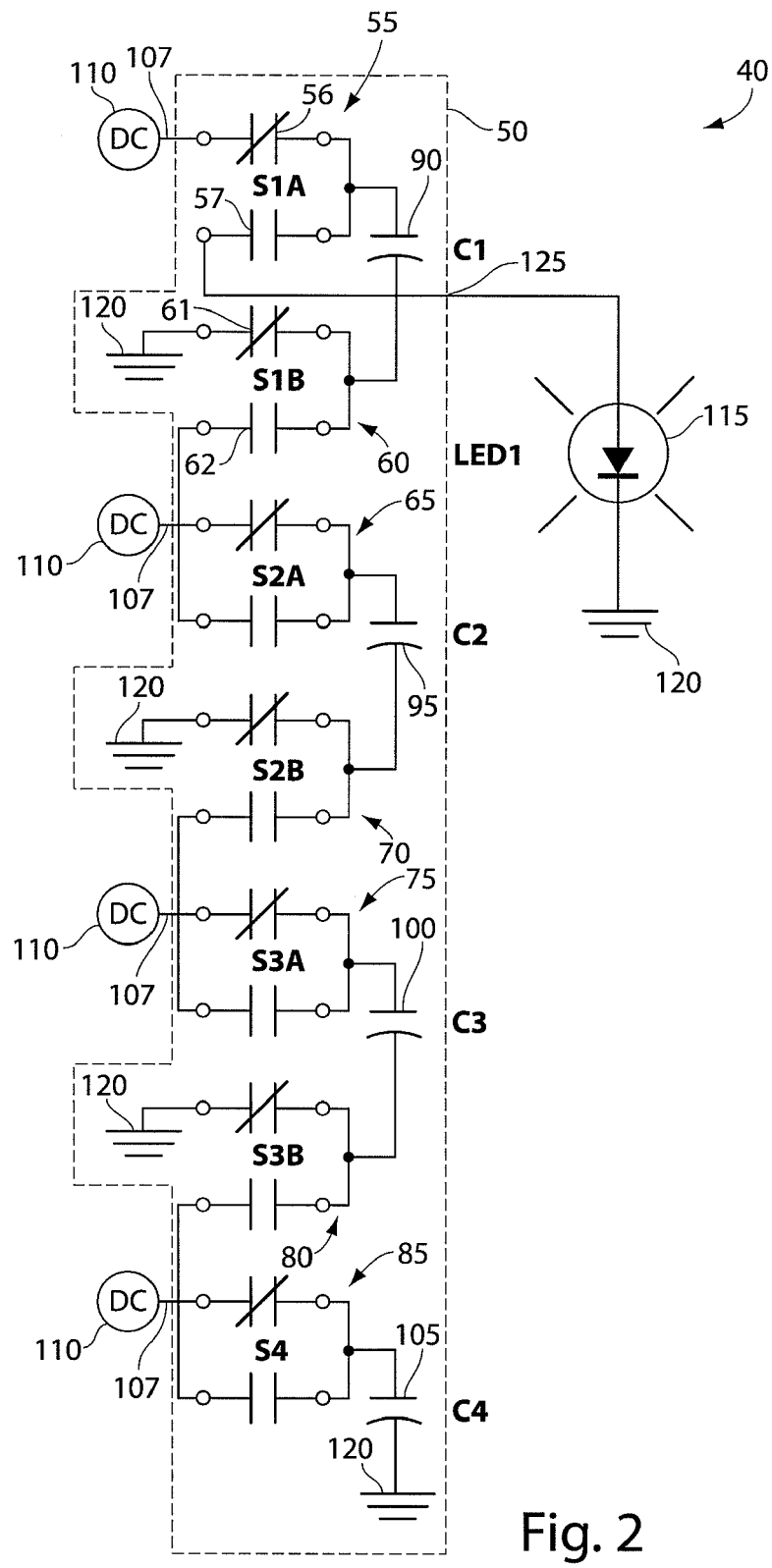
FIG. 2 is a diagram of a charging circuit used to provide power derived from a tree to a load.

Referring also to FIG. 2, an exemplary embodiment 40 of the apparatus 1 including an LED load 115, and an exemplary circuit 30 that is a charging circuit 50, which includes switches 55, 60, 65, 70, 75, 80, and 85, and capacitors 90, 95, 100, and 105. The switches 55, 60, 65, 70, 75, 80, and 85 are single-pole double-throw (SPDT) switches. The switch 55 includes selective connections 56 and 57. The switch 57 is connected on one side to the switch 56 and the capacitor 90 and on its other side to an output 125 configured to be connected to the load 115. The switch 60 also includes selective connections 61 and 62. When the switches 55 and 60 are in a first state, the connections 56 and 61 are closed and the connections 57 and 62 are open, thereby coupling the capacitor 90 between a power source 110 (here, a tree) and a ground 120. When the switches 55 and 60 are in a second state, the connections 56 and 61 are open, and the connections 57 and 62 are closed, thereby coupling the capacitor 90 between the load LED 115, and the switch 65. Each of the switches 55, 65, 75, and 85 are coupled to the tree 110 via the tap 107. The switches 65, 70, 75, 80, and 85 operate as described with respect to the switches 55 and 60.

The capacitors 90, 95, 100, and 105 are coupled to the switches 55, 60, 65, 70, 75, 80, and 85 such that when the switches 55, 60, 65, 70, 75, 80, and 85 are in a first state, the circuit 50 is in a charging state and each of the capacitors 90, 95, 100, and 105 are coupled between the power source 110 and the ground 120. When the switches 55, 60, 65, 70, 75, 80, and 85 are in the first state the capacitors 90, 95, 100, and 105 accumulate an electrical charge. The capacitors 90, 95, 100, and 105 are further coupled to the switches 55, 60, 65, 70, 75, 80, and 85 such that when the switches 55, 60, 65, 70, 75, 80, and 85 are in a second state, the circuit 50 is in a discharging state and the capacitors 90, 95, 100, and 105 are coupled in series between the ground 120 and a load 115 thus providing power to the load 115. The voltage provided to the load 115 is substantially equal to the sum of the voltages across each of the capacitors 90, 95, 100 and 105. The capacitors 90, 95, 100, and 105 are preferably about 10,000 µF, but other capacitances are possible. While an LED is shown as the load 115, other loads may be used.

While the charging circuit 50 is shown coupled to a single tree (i.e., the tree 110), other configurations are possible. For example, each of the switches 55, 65, 75, and 85 may be connected to separate trees. The switches 55, 65, 75, and 85 could each be connected to multiple trees (or other non-animal organisms). One or more of the switches 55, 65, 75, and 85 could each be connected to a single tree with multiple taps 107. One of the switches 55, 65, 75, and 85 could be connected to a single tree with a single tap, with the remainder of the switches 55, 65, 75, and 85 being connected to multiple trees, each with multiple taps. One of the switches 55, 65, 75, and 85 could be connected to a single tree with multiple taps, with the remainder of the switches 55, 65, 75, and 85 being coupled to a single tree with multiple taps. Each of the switches 55, 65, 75, and 85 may be coupled to a single tree or multiple trees using more than one of the tap 107.

Figure 3:
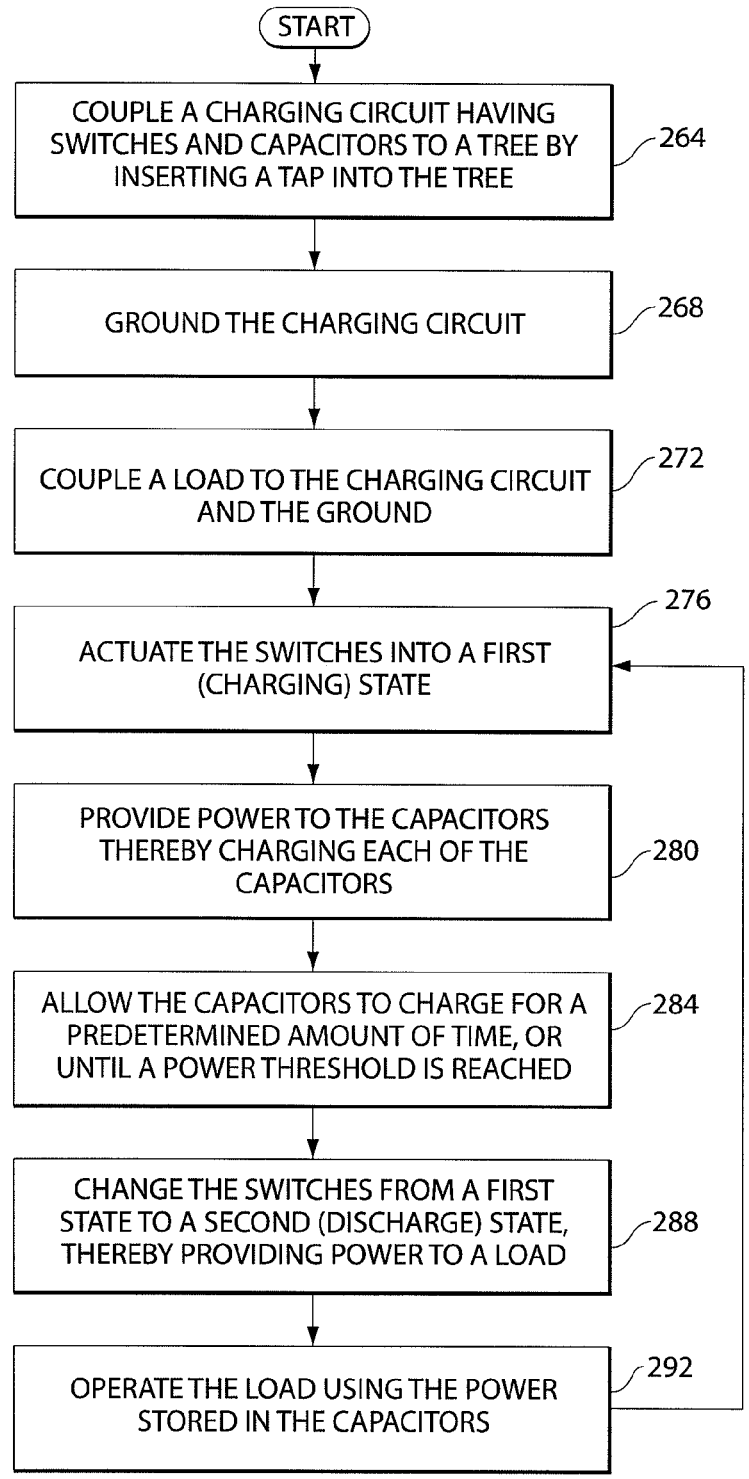
FIG. 3 is a flowchart of a process for deriving power from a tree using the charging circuit shown in FIG. 2.

In operation, referring to FIG. 3, with further reference to FIG. 2, a process 260 for providing power derived from a tree to a load using the apparatus 40 includes the stages shown. The process 260, however, is exemplary only and not limiting. The process 260 may be altered, e.g., by having stages added, removed, or rearranged.

At stage 264, the charging circuit 50 is coupled to the living non-animal organism power source 110, such as a tree, a plant, etc. Preferably, the tap 107 is inserted into the power source 110. The tap 107 is inserted approximately 0.375 inches to 0.75 inches into the tree. Alternatively, a non-invasive tap may be used, e.g., a transformer core can be placed around a circumference of the tree.

At stage 268, the charging circuit 50 is grounded. Preferably, the charging circuit 50 is coupled to a ground rod, or other suitable electrical ground, such as a ground connection in a typical residential power system.

At stage 272, the load 115 is coupled between the charging circuit 50 and the ground 120. The load 115 is coupled on one side to the output 125 of the charging circuit 50 and on its other side to the ground 120.

At stage 276, the switches 55, 60, 65, 70, 75, 80, and 85 are actuated into the first (charging) state. The connections 56 and 61 of the switches 55 and 60 are closed, the connections 57 and 62 of the switches 55 and 60 are opened, and likewise for the switches 65, 70, 75, 80, and 85. This couples the capacitors 90, 95, 100, and 105 to the taps 107.

At stage 280, the power is provided from the tree 110 to the capacitors 90, 95, 100, and 105. The capacitors 90, 95, 100, and 105 store energy received from the taps 107.

At stage 284, the capacitors 90, 95, 100, and 105 are allowed to charge. The amount of time the capacitors 90, 95, 100, and 105 are charged may vary to suit a specific application. For example, to provide sufficient power to illuminate the LED, each of the capacitors 90, 95, 100, and 105 is charged to 0.5 Vdc. The amount of time for the capacitors 90, 95, 100, and 105 to reach 0.5 Vdc may vary depending on the amount of power supplied by a particular power source.

At stage 288, the switches 55, 60, 65, 70, 75, 80, and 85 are changed from the first state to the second state to discharge the power accumulated in the capacitors 90, 95, 100, and 105, thereby providing power to the load 115.

The power from the capacitors 90, 95, 100, and 105 is used to operate the load 115, here causing the LED to emit light. The process 260 returns to stage 276 where the switches 55, 60, 65, 70, 75, 80, and 85 are changed from the second state to the first state, thereby providing power from the taps 107 to the capacitors 90, 95, 100, and 105.

Figure 4:
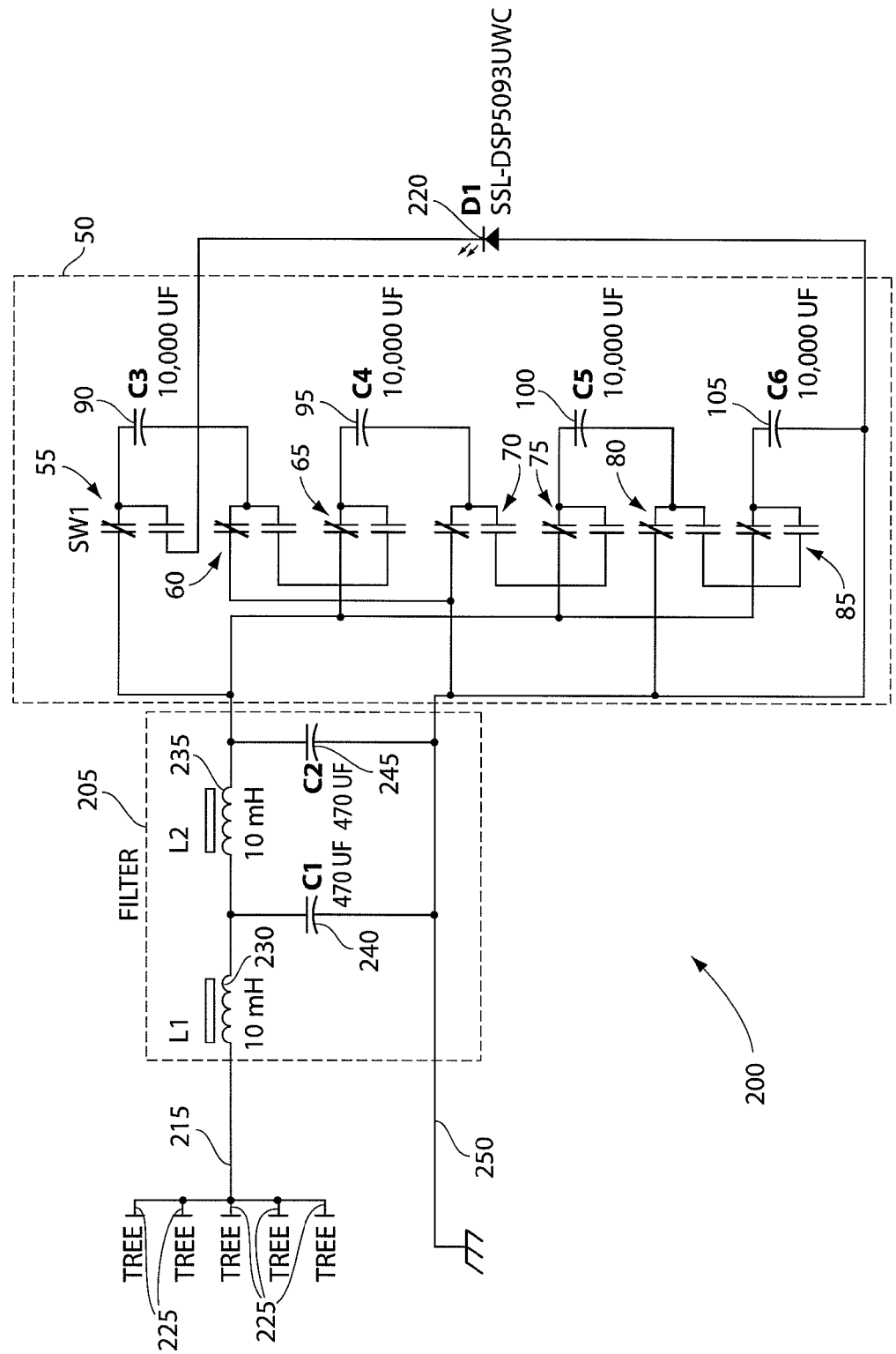
FIG. 4 is a circuit diagram of a filtered charging circuit used in providing electricity from a tree to a load, including the charging circuit of FIG. 2 and a filter.

Referring to FIGS. 2 and 4, a filtered charging circuit 200 includes a filter circuit 205 and the charging circuit 50, which are coupled to a power input 215, a load 220 (in FIGS. 2 and 4 an LED), and a ground connector 250. The filter circuit 205 is coupled between the power input 215 and the charging circuit 50, and is configured to provide substantially DC power to the charging circuit 50. The power input 215 is coupled to multiple taps 225 configured to be inserted into one or more trees. As described above with reference to FIG. 2, the charging circuit can provide the load 220 with a stepped-up, substantially DC voltage.

The filter circuit 205 includes inductors 230 and 235, and capacitors 240 and 245. The inductors 230 and 235 are coupled in series between the power input 215 and the charging circuit 50 to inhibit high-frequency power produced by the tree from reaching the charging circuit 50. The capacitor 240 is coupled between the junction of the inductors 230 and 235 and the ground 250. The capacitor 245 is coupled between the junction of the inductor 235 and the charging circuit 50 and the ground 250. For example, the inductors 230 and 235, and the capacitors 240 and 245 are arranged in a 2-stage pie filter configuration. The capacitors short-out (e.g., ground) high-frequency power produced by the tree, further inhibiting non-DC power from being conducted to the charging circuit 50. The inductors 230 and 235 are preferably about 10 mH, although other inductances are possible. The capacitors 240 and 245 are preferably about 470 µF, although other capacitances are possible. The charging circuit 50 is configured to receive substantially DC power from the filter circuit 205, and to output intermittent DC power to the load 220 similar to the description provided above with respect to FIG. 2.

Figure 5:
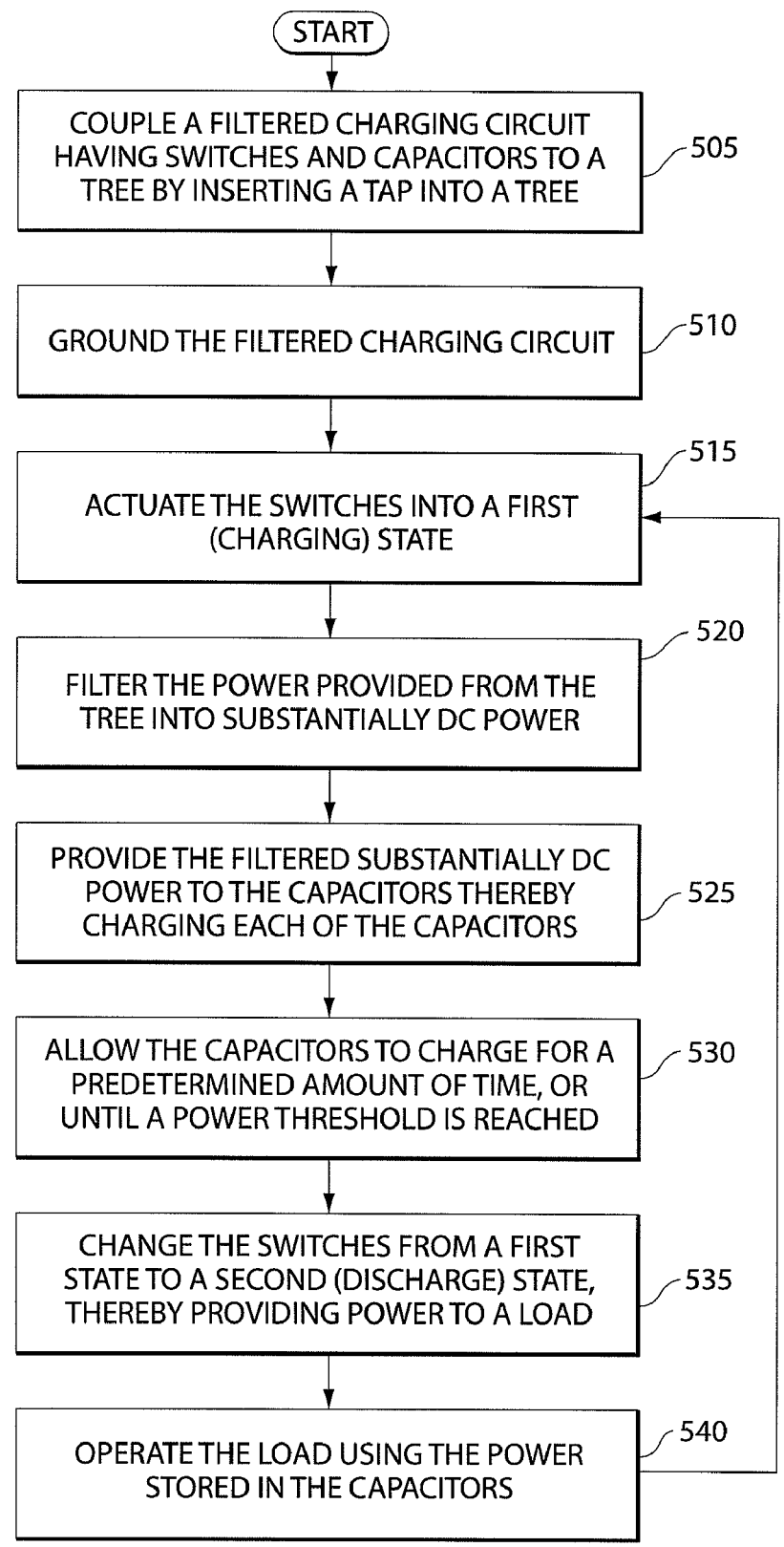
FIG. 5 is a flowchart of a process of deriving power from a tree using the electrical circuit shown in FIG. 4.

In operation, referring to FIG. 5, with further reference to FIG. 4, a process 500 for providing power derived from a tree to the load 220 using the filtered charging circuit 200 includes the stages shown. The process 500, however, is exemplary only and not limiting. The process 500 may be altered, e.g., by having stages added, removed, or rearranged.

At stage 505, the filtered charging circuit 200 is coupled to the power input 215 such as a tree, a fungus, or other suitable non-animal organism, here by inserting the taps 225 into a single tree. Each of the taps 225 is inserted approximately 0.375 inches to approximately 0.75 inches into the tree. If any of the taps 225 are non-invasive, then that (those) taps(s) 225 (e.g., a transformer core) is (are) mounted accordingly. (e.g., placed around the circumference of a tree).

At stage 510, the filtered charging circuit 200 is coupled to ground. The filtered charging circuit 200 is connected to the ground connector 250, such as a rod, or other suitable electrical ground connector (e.g., a ground connection in a typical residential power system).

At stage 515, the switches 55, 60, 65, 70, 75, 80, and 85 are actuated into a first (charging) state coupling the capacitors 90, 95, 100, and 105 to the filter circuit 205. Power flows from the filter circuit 205 to the capacitors 90, 95, 100, and 105.

At stage 520, the power derived from the tree is filtered to substantially remove alternating current (AC). At stage 520 the filter circuit 205 filters the power derived from the taps 225 into substantially DC power. The combination of the inductors 230 and 235 and the capacitors 240 and the 245 substantially filters out non-DC frequencies produced by the tree. The inductors 230 and 235 choke the high-frequencies produced by the tree. The capacitors 240 and 245 inhibit low frequency power and conduct high-frequency power to the ground connector 250. The filter circuit 205 provides the filtered substantially DC power to the charging circuit 50.

At stage 525 the filtered substantially DC power from the filter circuit 205 is provided to the capacitors 90, 95, 100, and 105. The switches 55, 60, 65, 70, 75, 80, and 85 are put in the first state to couple the circuit 205 to the capacitors 90, 95, 100, and 105 to provide power to, and charge, the capacitors 90, 95, 100, and 105. At stage 530, the capacitors 90, 95, 100, and 105 are allowed to charge. The amount of time the capacitors 90, 95, 100, and 105 are charged varies, and may be tailored to suit a specific application. For example, to provide sufficient power to illuminate the load 220, each of the capacitors is charged to 0.5 Vdc. The amount of time required to reach 0.5 Vdc may vary depending on the amount of power supplied by a particular power source.

At stage 535, the switches 55, 60, 65, 70, 75, 80, and 85 are changed from the first state to the second state to discharge the power accumulated in the capacitors 90, 95, 100, and 105, thereby providing power to the load 220.

After stage 535, the switches 55, 60, 65, 70, 75, 80, and 85 are actuated from the second state to the first state, thereby providing filtered substantially DC power from the filter circuit 205 to the charging circuit 50. The stages 515, 520, 525, and 530 may be repeated.

At stage 540, the power from the capacitors 90, 95, 100, and 105 is used to operate the load 220, here causing the LED to emit light. The process 500 returns to stage 515 where the switches 55, 60, 65, 70, 75, and 85 are changed from the second state to the first state, thereby providing power from the taps 225 to the capacitors 90, 95, 100, and 105

Figure 6:
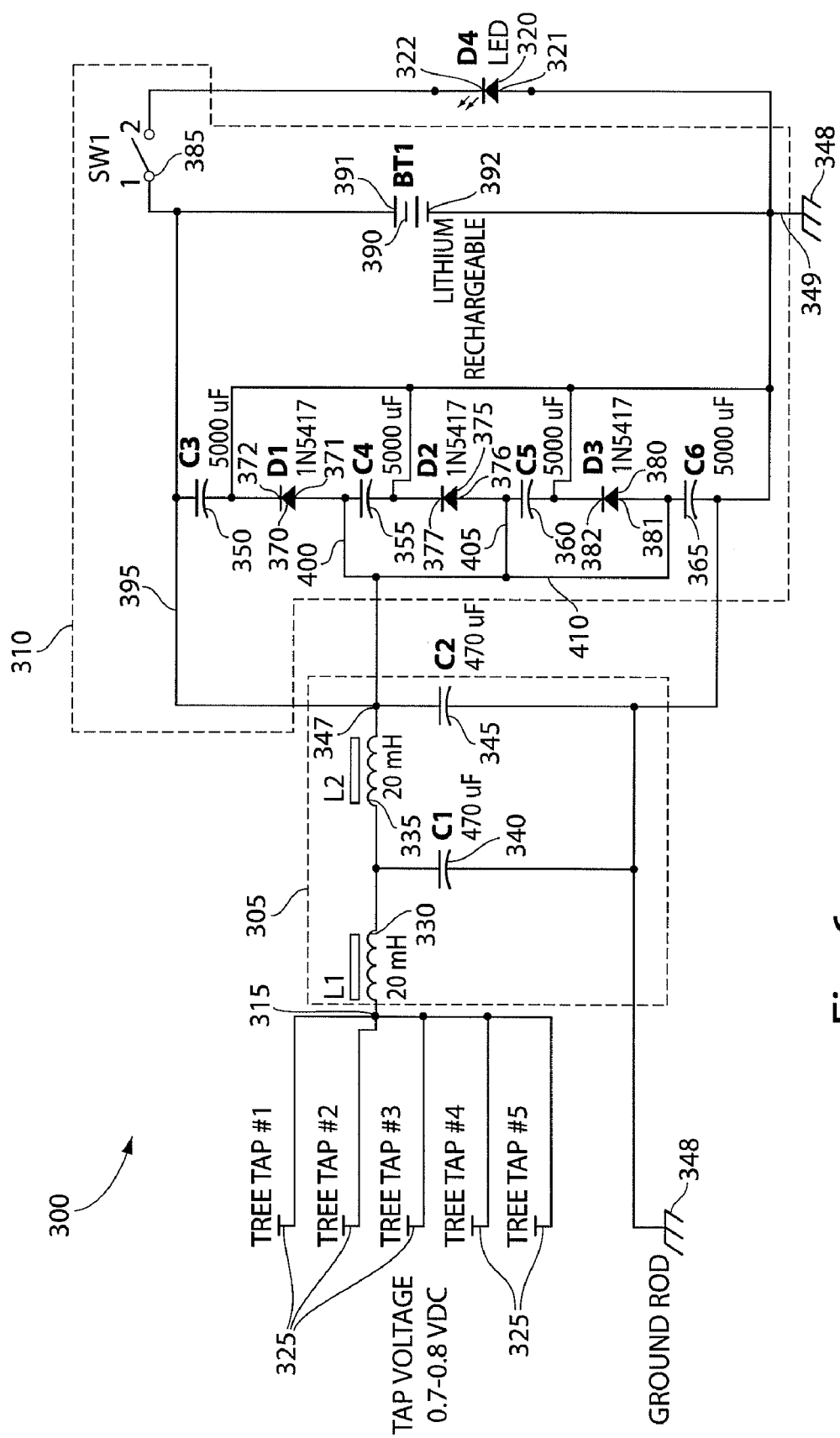
FIG. 6 is a circuit diagram of a filtered charging circuit used in providing electricity from a tree to a load and including a battery.

Referring to FIG. 6, a filtered charging circuit 300 includes a filter circuit 305 and a charging circuit 310, which are coupled to a power input 315 and a load 320 (in FIG. 6, an LED). The filter 305 is coupled between the power input 315 and the charging circuit 310, and is configured to provide substantially DC power to the charging circuit 310. The power input 315 is coupled to multiple taps 325 that are each configured to be inserted into a tree. The load 320 is preferably a SSL-DSP5093UWC LED (manufactured by Lumex Incorporated, of Palatine, Ill.), although other LEDs, and other types of loads, may be used.

The filter circuit 305 includes inductors 330 and 335, capacitors 340 and 345, and an output node 347. The inductors 330 and 335 are coupled in series between the power input 315 and the output node 347 and are of inductances to serve as chokes of any high-frequencies received at the power input 315. The capacitor 340 is coupled between the junction of the inductors 330 and 335 and the ground 348. The capacitor 345 is coupled between the output node 347 and the ground 348. For example, the inductors 330 and 335, and the capacitors 340 and 345 are arranged in a 2-stage pie filter configuration. The inductors 330 and 335 are preferably about 10 mH, although other inductances are possible. The capacitors 340 and 345 work in conjunction with the inductors 330 and 335 shorting-out high frequency signals that may have passed through the inductors 330 and 335, respectively. The capacitors 340 and 345 are preferably about 470 µF, although other capacitances are possible.

The charging circuit 310 includes capacitors 350, 355, 360, and 365, diodes 370, 375, and 380, a switch 385, a battery 390, and a ground connection 349 connected to the ground 348. Coupled between the output node 347 and the ground connection 349 are the capacitors 350, 355, 360, and 365, and the diodes 370, 375, and 380, in an alternating series of capacitors and diodes. Anodes 371, 376, and 381 of the diodes 370, 375, and 380, respectively, are coupled to the output node 347. Cathodes 372, 377, and 382 of the diodes 370, 375, and 380, respectively, are coupled to the ground connection 349. The capacitor 350 is coupled between the cathode 372 of the diode 370 and the output node 347. The capacitor 365 is coupled between the anode 381 of the diode 380 and the ground connection 349. The capacitors 350, 355, 360, and 365, and the diodes 370, 375, and 380 act as a voltage multiplier circuit to allow filtered substantially DC power to charge the capacitors 350, 355, 360, and 365 (e.g., by summing the voltages across the capacitors 350, 355, 360, and 365). Using the capacitors 350, 355, 360, and 365, and the diodes 370, 375, and 380, a higher voltage (e.g., 2-2.5 V) is produced to charge the battery 390. The capacitors 350, 355, 360, and 365 are 5,000 µF, although other capacitances are possible, such as 10,000 µF. The diodes 370, 375, and 380 are preferably 1N5417 diodes, but other diodes are possible.

The battery 390 is coupled between the output node 347 and the ground 348 such that it may receive power from the output node 347. The battery 390 is preferably a lithium-ion battery, but other batteries may be used. A positive terminal 391 of the battery 390 is coupled to the output node 347 and the switch 385. A negative terminal 392 of the battery 390 is coupled to the ground 348. Other configurations are possible (e.g., coupling the negative terminal 392 to the output node 347, and coupling the positive terminal 391 to the ground 348).

The switch 385 is coupled between a terminal 322 of the load 320 and output node 347 to control a power flow to the load 320. When the switch 385 is in an open state (as shown), power is inhibited (and preferably prevented) from flowing to the load 320. When the switch 385 is in a closed state, power may flow to the load 320. A terminal 321 of the load 320 is coupled to the ground 348.

Figure 7:
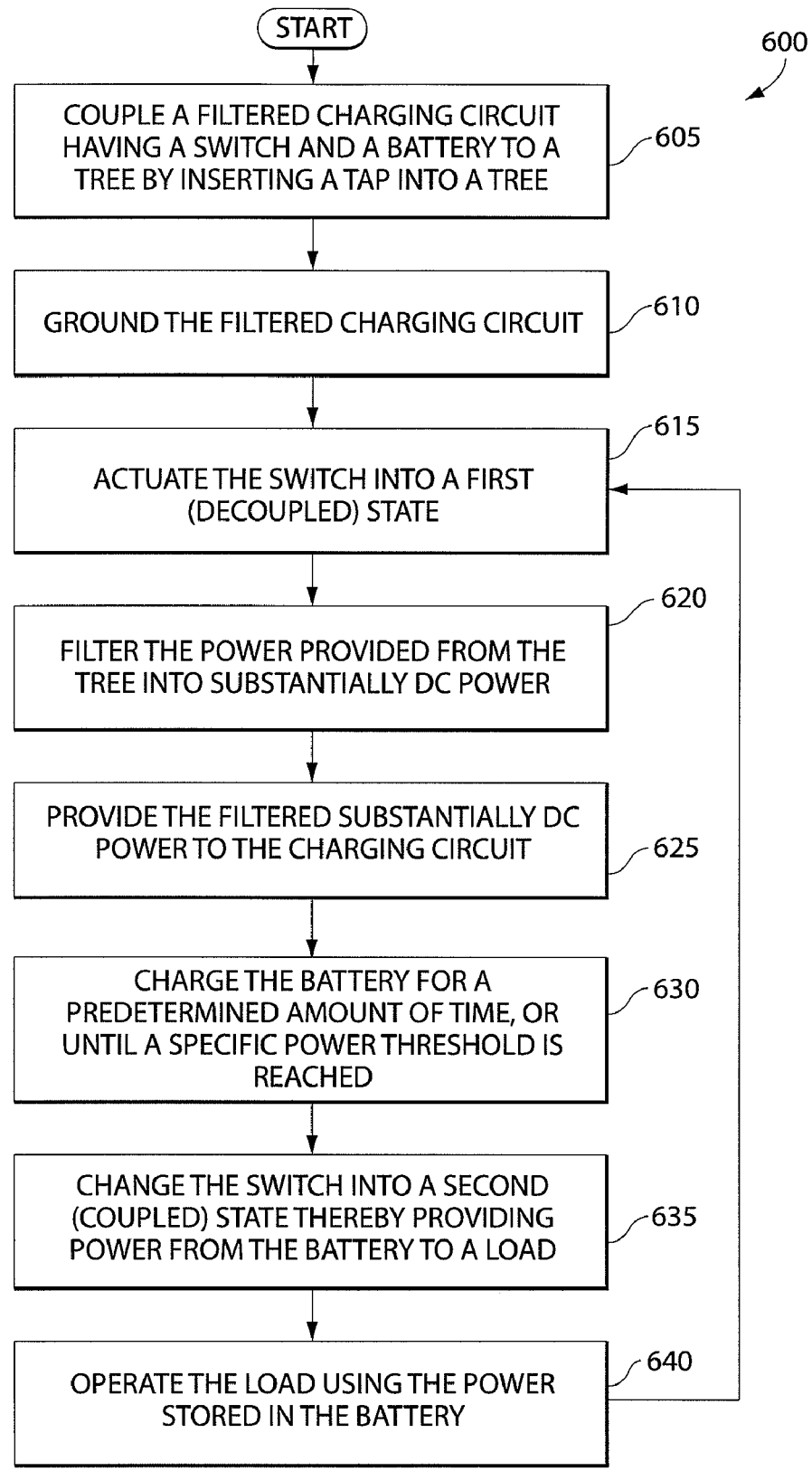
FIG. 7 is a flowchart of a process of deriving power from a tree using the electrical circuit shown in FIG. 6.

In operation, referring to FIG. 7, with further reference to FIG. 6, a process 600 for providing power derived from a tree to the load 320 using the filtered charging circuit 300 includes the stages shown. The process 600, however, is exemplary only and not limiting. The process 600 may be altered, e.g., by having stages added, removed, or rearranged.

At stage 605, the filtered charging circuit 300 is coupled to the power input 315 such as a tree, a fungus, or other suitable non-animal organism, here by inserting the taps 325 into a single tree. Each of the taps 325 is inserted approximately 0.375 inches to approximately 0.75 inches into the tree. If any of the taps 325 are non-invasive, then that (those) taps(s) 325 (e.g., a transformer core) is (are) mounted accordingly. (e.g., placed around the circumference of a tree).

At stage 610, the filtered charging circuit 300 is coupled to ground. The filtered charging circuit 300 is connected to the ground connector 349, such as a rod, or other suitable electrical ground connector (e.g., a ground connection in a typical residential power system).

At stage 615, the switch 385 is actuated into the first state (i.e., open) where the load 320 is disconnected from the filtered charging circuit 300 and current is inhibited/prevented from reaching/operating the LED 320.

At stage 620, the power derived from the tree is filtered to substantially remove alternating current (AC). At stage 620 the filter circuit 305 filters the power derived from the taps 325 into substantially DC power. The combination of the inductors 330 and 335 and the capacitors 340 and the 345 substantially filters out non-zero frequencies produced by the tree. The inductors 330 and 335 choke the high-frequencies produced by the tree. The capacitors 340 and 345 inhibit low frequency power and conduct high-frequency power to the ground connector 349. The filter circuit 305 provides the filtered substantially DC power to the charging circuit 310.

At stage 625, the filtered substantially DC power is provided to the charging circuit 310 via the output node 347. Power provided from the output node 347 is conducted through the capacitors 350, 355, 360, and 365, and the diodes 370, 375, and 380. The configuration of the diodes 370, 375, and 380 allows substantially only filtered DC power to charge the capacitors 350, 355, 360, and 365.

At stage 630, the battery 390 is charged using power from the output node 347 and the capacitors 350, 355, 360, and 365. The amount of time the battery 390 is charged varies, and may be tailored to suit a specific application. The battery 390 may be charged for a specific predetermined amount of time, or may be charged until a certain power threshold is reached.

At stage 635 the switch 385 is actuated into the second state (e.g., closed) coupling the load 320 across the terminals 391 and 392 of the battery 392, thereby providing power from the battery 390 to the LED 320. Power may also be provided to the load 320 from the output node 347 and/or the capacitors 350, 355, 360, and 365. The stages 615, 620, 625, 630, and 635 may be repeated.

At stage 640, the power from the capacitors 350, 355, 360, and 365, and the battery 390 is used to operate the load 320, here causing the LED to emit light. The process 600 returns to stage 615 where the switch 385 is changed from the second state to the first state, thereby decoupling the load 320 from the positive terminal 391 of the battery 390, the output node 347, and the capacitor 350.

Experiment 1

Referring to Appendix A, exemplary results of voltage yield tests from different trees using different tap configurations, and different numbers of taps are shown. The tests were performed using the configuration shown in FIG. 1, and described in the corresponding written description, where the load was a voltmeter. The circuit 30, however, as shown in FIG. 1, was omitted in the tests. The tests were performed selecting different geographic locations of the trees, different types of trees, different tap materials, different tap depths, different tap diameters, different tap heights (i.e., height from ground level), different tree altitudes, varying numbers of taps, and varying soil conditions. As shown in Appendix A, factors such as the species and/or the variety of a particular plant, e.g., tree, affects the available voltage and/or current. For example, an oak tree located 40 feet above sea level and a maple tree located 200 feet above sea level provided differing amounts of voltage and/or current. Trees produced a substantially constant DC voltage (and some AC voltage), while other plants produced a less-constant DC voltage than trees.

Experiment 2

The charging circuit 50 (of FIG. 2) was used to successfully power an LED. The charging circuit 50, using four 10,000 µF (35 Vdc) capacitors, successfully illuminated an SSL-DSP5093UWC LED (manufactured by Lumex Incorporated, of Palatine, Ill.) for approximately one second. The charging circuit 50 was placed in the charging state for approximately 1.75 hours, thereby charging the capacitors 90, 95, 100, and 105. At the end of the charging period, there was approximately a 0.5 Vdc potential in each of the capacitors 90, 95, 100, and 105, storing approximately 0.0125 Joules of energy in each of the capacitors 90, 95, 100, and 105. To light the LED, the switches 55, 60, 65, 70, 75, 80, and 85 were actuated, changing the switches 55, 60, 65, 70, 75, 80, and 85 from the first (charging) state, to the second (discharge) state, thereby providing 2 Vdc to the LED (4×0.5 Vdc) and illuminating the LED. After approximately one second of the LED being illuminated, the voltage across the LED dropped to 1.5 Vdc and the LED no longer illuminated (the lower operating threshold of the SSL-DSP5093UWC LED is approximately 1.5V). The capacitors 90, 95, 100, and 105 were allowed to recharge for approximately one hour to again reach a 0.5 Vdc potential across each of the capacitors 90, 95, 100, and 105.

Other embodiments are within the scope and spirit of the invention, including the appended claims. Features implementing functions may be physically located at various positions, including being distributed such that portions of functions are implemented at different physical locations. Loads other than LEDs may be used, such as a transmitter, receiver, microchip, incandescent light source, infrared light source, a laser, a DC/DC voltage converter, a DC/AC inverter, etc. Power may be drawn from non-animal organisms other than trees. For example, broccoli plants, tomato plants, soybean plants, and mushrooms may be used. Also, potted plants, and potted trees may be used. The tap may be inserted into a branch of the tree.

While the tap has been disclosed as a nail, other configurations are possible such as a staple. Non-invasive embodiments of the tap are possible, e.g., a donut-shaped transformer core placed around the circumference of a tree. The surface area of a tap may be increased by, for example, being threaded (e.g., being a screw) and/or placing outwardly disposed barbs on the tap. A tap may have a flange disposed around the circumference of the tap to help a user insert the tap correctly into a tree (e.g., to the correct depth). A tap may include a handle to help in insertion into the tree and/or removal from the tree.

While the terms "connected," "connector," "coupled," and "connection" have been used to indicate a direct connection, other configurations are possible. For example, referring to FIG. 6, when the diode 380 is "coupled" to the capacitor 360, this may include indirect connection through another component (e.g., a resistor coupled between the cathode 382 of the diode 380 and the capacitor 360).

The word "or" is to be construed as including the conjunctive and disjunctive definition.

Further, while the description refers to the invention, the description may include more than one invention.

APPENDIX A

POWER SOURCE
DATA COLLECTION

| Test No. | Time Intervals | Voltage DC | Tree Type | Nail Type | Nail Penetration Depth | Nail Diameter | Height from Ground | No. of Nails | Soil Type | Altitude |
|---|---|---|---|---|---|---|---|---|---|---|
| 1 | 7:00 PM | 0.9 VDC | PINE | STAINLESS | ¾" | ⅛" | 3 FT | 2 | LOAM | |
| 2 | 7:25 | 0.9 VDC | PINE | STAINLESS | ¾" | ⅛" | 4 FT | 2 | LOAM | |
| 3 | 7:40 | 0.9 VDC | PINE | STAINLESS | ¾" | ⅛" | 5 FT | 2 | LOAM | |
| 1 | 1:00 PM | 1.0 VDC | PINE | STAINLESS | ¾" | ⅛" | 5 FT | 2 | CLAY-SAND | |
| 1 | 10 MIN | -1.2 | EIM | ¾" | ⅜ | | 18" | 1 | SAND | 40 |
| 2 | | -1.6 | BLUE SPRUCE | ¾" | ⅜ | | 18" | 1 | SAND | 40 |
| 3 | | -1.0 | MAPLE | ¾" | ⅜ | | 18" | 1 | SAND | 40 |
| 4 | | -1.1 | MAPLE | ¾" | ⅜ | | 18" | 1 | SAND | 40 |
| 5 | | -1.2 | EIM | ¾" | ⅜ | | 18" | 1 | SAND | 40 |
| 6 | | -1.1 | WALNUT | ¾" | ⅜ | | 18" | 1 | SAND | 40 |
| 7 | | -0.8 | LILAC BUSH | ¾" | ⅜ | | 18" | 1 | SAND | 40 |
| 8 | | -1.1 | ELM | ¾" | ⅜ | | 18" | 1 | SAND | 40 |

APPENDIX A-continued

POWER SOURCE DATA COLLECTION

| Test No. | Time Intervals | Voltage DC | Tree Type | Nail Type | Nail Penetration Depth | Nail Diameter | Height from Ground | No. of Nails | Soil Type | Altitude |
|---|---|---|---|---|---|---|---|---|---|---|
| 9 | | −1.6 | BLUE SPRUCE | ¾" | ⅜ | | 18" | 1 | SAND | 40 |
| 10 | | −1.1 | MAPLE | ¾" | ⅜ | | 18" | 1 | SAND | 40 |
| 11 | | −1.1 | MAPLE | ¾" | ⅜ | | 18" | 1 | SAND | 40 |
| 12 | | −1.4 | BIRCH | ¾" | ⅜ | | 18" | 1 | SAND | 40 |
| 13 | | −1.4 | BIRCH | ¾" | ⅜ | | 36" | 1 | SAND | 40 |
| 14 | | −1.5 | BIRCH | ¾" | ⅜ | | 2" | 1 | SAND | 40 |
| 15 | | −1.2 | OAK | ¾" | ⅜ | | 18" | 4 | SAND | 40 |
| 16 | | −1.2 | ELM | ¾" | ⅜ | | 18" | 1 | SAND | 40 |
| 17 | | −1.5 | APPLE | ¾" | ⅜ | | 18" | 1 | SAND | 40 |
| 18 | | −1.5 | APPLE | ¾" | ⅜ | | 36" | 1 | SAND | 40 |
| 19 | | −1.3 | OAK | ¾" | ⅜ | | 18" | 1 | SAND | 40 |
| 20 | | −1.2 | MAPLE | ¾" | ⅜ | | 18" | 1 | SAND | 40 |
| 21 | | −0.8 | ? BUSH | ¾" | ⅜ | | 12" | 1 | SAND | 40 |
| 22 | | −1.1 | ELDER | ¾" | ⅜ | | 18" | 1 | SAND | 40 |
| 23 | | −1.6 | SPRUCE | ¾" | ⅜ | | 18" | 1 | SAND | 40 |
| 24 | | −1.2 | OAK | ¾" | ⅜ | | 18" | 1 | SAND | 40 |
| 25 | | −1.1 | GREEN | ¾" | ⅜ | | 18" | 1 | SAND | 40 |
| 26 | | −1.1 | SPRUCE | ¾" | ⅜ | | 36" | 1 | SAND | 40 |
| 27 | | −1.1 | | ¾" | ⅜ | | 48" | 1 | SAND | 40 |
| 28 | | −1.1 | | ¾" | ⅜ | | 8" | 1 | SAND | 40 |
| 29 | | −1.1 | | ¾" | ⅜ | | 2" | 1 | SAND | 40 |
| 30 | | −1.1 | | ¾" | ⅜ | | 4" | 1 | SAND | 40 |
| 31 | | −1.0 | BIRCH | ¾" | ⅜ | | 18" | 1 | SAND | 40 |
| 32 | | −1.0 | BIRCH | ¾" | ⅜ | | 12" | 1 | SAND | 40 |
| 33 | | −1.0 | BIRCH | ¾" | ⅜ | | 5" | 1 | SAND | 40 |
| 34 | | −1.1 | MAPLE | ¾" | ⅜ | | 18" | 1 | SAND | 40 |
| 35 | | −1.4 | OAK | ¾" | ⅜ | | 18" | 1 | SAND | 40 |
| 36 | | −0.9 | ? | ¾" | ⅜ | | 12" | 1 | SAND | 40 |
| 37 | | 1.1 | ELM | ¾" | ⅜ | | 18" | 1 | SAND | 40 |
| 38 | | 1.2 | ELM | ¾" | ¼ to ⅜ | | 18" | 1 | SAND | APPOX 60 |
| 39 | | 1.1 | OAK | ¾" | ¼ to ⅜ | | 18" | 1 | SAND | APPOX 60 |
| 40 | | 1.1 | OAK | ¾" | ¼ to ⅜ | | 18" | 1 | SAND | APPOX 60 |
| 41 | | 1.2 | ELM | ¾" | ¼ to ⅜ | | 18" | 1 | SAND | APPOX 60 |
| 42 | | 1.0 | BIRCH | ¾" | ¼ to ⅜ | | 18" | 1 | SAND | APPOX 60 |
| 43 | | 1.2 | MAPLE | ¾" | ¼ to ⅜ | | 18" | 1 | SAND | APPOX 60 |
| 44 | | 1.4 | BLUE SPRUCE | ¾" | ¼ to ⅜ | | 18" | 1 | SAND | APPOX 60 |
| 45 | | 1.1 | ELM | ¾" | ¼ to ⅜ | | 18" | 1 | SAND | APPOX 80 |
| 46 | | 1.3 | MAPLE | ¾" | ¼ to ⅜ | | 18" | 1 | SAND | APPOX 60 |
| 47 | | 1.1 | MAPLE | ¾" | ¼ to ⅜ | | 18" | 1 | SAND | APPOX 60 |
| 48 | | −1.2 | APPLE | ¾" | ¼ to ⅜ | | 18" | 5 | SAND | 40 |
| 49 | | −1.2 | APPLE | ¾" | ¼ to ⅜ | | 30" | 4 | SAND | 40 |
| 50 | | −1.3 | WILLOW | ¾" | ¼ to ⅜ | | 18" | 1 | SAND | 40 |
| 51 | | −1.3 | WILLOW | ¾" | ¼ to ⅜ | | 24" | 1 | SAND | 40 |
| 52 | | −1.3 | WILLOW | ¾" | ¼ to ⅜ | | 36" | 1 | SAND | 40 |
| 53 | | −1.0 | MAPLE | ¾" | ¼ to ⅜ | | 18" | 1 | SAND | 40 |
| 54 | | −1.1 | MAPLE | ¾" | ¼ to ⅜ | | 0" | 1 | SAND | 40 |
| 55 | | −1.2 | ELM | ¾" | ¼ to ⅜ | | 18" | 1 | SAND | 40 |
| 56 | | 1.3 | OAK | ¾" | ¼ to ⅜ | | 18" | 1 | SAND CLAY | 120 |
| 57 | | 1.1 | ELM | ¾" | ¼ to ⅜ | | 18" | 1 | SAND CLAY | 120 |
| 58 | | 1.4 | SASAFRAS | ¾" | ¼ to ⅜ | | 18" | 1 | SAND CLAY | 120 |
| 59 | | 1.0 | OAK | ¾" | ¼ to ⅜ | | 18" | 1 | SAND CLAY | 120 |
| 60 | | 1.0 | OAK | ¾" | ¼ to ⅜ | | 38" | 1 | SAND CLAY | 120 |
| 61 | | 1.2 | OAK | ¾" | ¼ to ⅜ | | 0" | 1 | SAND CLAY | 120 |
| 62 | | 1.3 | SPRUCE | ¾" | ¼ to ⅜ | | 18" | 1 | SAND CLAY | 120 |
| 63 | | 1.4 | SPRUCE | ¾" | ¼ to ⅜ | | 30" | 1 | SAND CLAY | 120 |
| 64 | | 1.2 | MAPLE | ¾" | ¼ to ⅜ | | 18" | 1 | SAND CLAY | 120 |
| 65 | | 1.1 | CEDAR | ¾" | ¼ to ⅜ | | 18" | 1 | SAND | 40 |
| 66 | | 1.4 | CHERRY | ¾" | ¼ to ⅜ | | 18" | 1 | SAND | 40 |
| 67 | | 1.4 | CHERRY | ¾" | ¼ to ⅜ | | 12" | 1 | SAND | 40 |
| 68 | | 1.5 | CHERRY | ¾" | ¼ to ⅜ | | 0" | 1 | SAND | 40 |
| 69 | | 1.4 | CHERRY | ¾" | ¼ to ⅜ | | 36" | 1 | SAND | 40 |
| 70 | | 1.1 | CEDAR | ¾" | ¼ to ⅜ | | 18" | 1 | SAND | 40 |
| 71 | | 1.2 | MAPLE | ¾" | ¼ to ⅜ | | 18" | 1 | SAND | 40 |
| 72 | | 1.2 | MAPLE | ¾" | ¼ to ⅜ | | 36" | 1 | SAND | 40 |
| 73 | | 1.3 | MAPLE | ¾" | ¼ to ⅜ | | 0" | 1 | SAND | 40 |
| 112 | | 0.9 | CEDAR | ¾" | ¼ to ⅜ | | 18" | 1 | SAND | 40' |
| 113 | | 0.9 | CEDAR | ¾" | ¼ to ⅜ | | 36" | 1 | SAND | 40' |
| 114 | | 1.0 | CEDAR | ¾" | ¼ to ⅜ | | 0" | 1 | SAND | 40' |
| 115 | | 1.0 | CEDAR | ¾" | ¼ to ⅜ | | 0" | 1 | SAND | 40' |
| 116 | | 1.3 | OAK | ¾" | ¼ to ⅜ | | 18" | 1 | SAND | 200' |
| 117 | | 1.3 | OAK | ¾" | ¼ to ⅜ | | 24" | 1 | SAND | 200' |
| 118 | | 1.3 | OAK | ¾" | ¼ to ⅜ | | 48" | 1 | SAND | 200' |

APPENDIX A-continued

POWER SOURCE
DATA COLLECTION

| Test No. | Time Intervals | Voltage DC | Tree Type | Nail Type | Nail Penetration Depth | Nail Diameter | Height from Ground | No. of Nails | Soil Type | Altitude |
|---|---|---|---|---|---|---|---|---|---|---|
| 119 | | 1.3 | OAK | ¾" | ¼ to ⅜ | | 0" | 1 | SAND | 200' |
| 120 | | 1.1 | MAPLE | ¾" | ¼ to ⅜ | | 18" | 1 | SAND | 200' |
| 121 | | 1.1 | MAPLE | ¾" | ¼ to ⅜ | | 24" | 1 | SAND | 200' |
| 122 | | 1.2 | MAPLE | ¾" | ¼ to ⅜ | | 0" | 1 | SAND | 200' |
| 123 | | 1.4 | SPRUCE | ¾" | ¼ to ⅜ | | 18" | 1 | SAND | 200' |
| 124 | | 1.5 | SPRUCE | ¾" | ¼ to ⅜ | | 0" | 1 | SAND | 200' |
| 125 | | 1.2 | OAK | ¾" | ¼ to ⅜ | | 18" | 1 | SAND | 200' |
| 126 | | 1.2 | OAK | ¾" | ¼ to ⅜ | | 24" | 1 | SAND | 200' |
| 127 | | 1.3 | OAK | ¾" | ¼ to ⅜ | | 0" | 1 | SAND | 200' |
| 128 | | 1.0 | MAPLE | ¾" | ¼ to ⅜ | | 18" | 1 | SAND | 200' |
| 129 | | 1.0 | MAPLE | ¾" | ¼ to ⅜ | | 24" | 1 | SAND | 200' |
| 130 | | 1.0 | MAPLE | ¾" | ¼ to ⅜ | | 36" | 1 | SAND | 200' |
| 131 | | 1.1 | MAPLE | ¾" | ¼ to ⅜ | | 0" | 1 | SAND | 200' |
| 132 | | −1.2 | MAPLE | ¾" | ¼ to ⅜ | | 24" | 1 | SAND | 200' |
| 133 | | −1.2 | MAPLE | ¾" | ¼ to ⅜ | | 24" | 4 | SAND | 200' |
| 134 | | −1.2 | ELM | ¾" | ¼ to ⅜ | | 18" | 1 | SAND | 200' |
| 135 | | −1.2 | ELM | ¾" | ¼ to ⅜ | | 30" | 1 | SAND | 200' |
| 136 | | −1.3 | ELM | ¾" | ¼ to ⅜ | | 44" | 8 | SAND | 200' |
| 137 | | −1.2 | ELM | ¾" | ¼ to ⅜ | | 60" | 1 | SAND | 200' |
| 138 | | −1.4 | SPRUCE | ¾" | ¼ to ⅜ | | 8" | 1 | SAND | 200' |
| 139 | | 1.2 | ELM | ¾" | ¼ to ⅜ | | 20" | 1 | SAND | 140' |
| 140 | | 1.2 | ELM | ¾" | ¼ to ⅜ | | 28" | 1 | SAND | 140' |
| 141 | | 1.2 | ELM | ¾" | ¼ to ⅜ | | 36" | 1 | SAND | 140' |
| 142 | | 1.4 | ELM | ¾" | ¼ to ⅜ | | 0" | 1 | SAND | 140' |
| 143 | | 1.6 | SPRUCE | ¾" | ¼ to ⅜ | | 18" | 1 | SAND | 140' |
| 144 | | 1.6 | SPRUCE | ¾" | ¼ to ⅜ | | 30" | 1 | SAND | 140' |
| 145 | | 1.4 | SPRUCE | ¾" | ¼ to ⅜ | | 0" | 1 | SAND | 140' |
| 146 | | 1.1 | MAPLE | ¾" | ¼ to ⅜ | | 18" | 1 | SAND | 140' |
| 147 | | 1.1 | MAPLE | ¾" | ¼ to ⅜ | | 24" | 1 | SAND | 140' |
| 148 | | 1.1 | MAPLE | ¾" | ¼ to ⅜ | | 46" | 1 | SAND | 140' |
| 149 | | 1.3 | MAPLE | ¾" | ¼ to ⅜ | | 0" | 1 | SAND | 140' |
| 150 | | 1.1 | OAK | ¾ | ¼-⅜ | | 18" | | SAND | 140' |
| 151 | | 1.1 | OAK | ¾ | ¼-⅜ | | 28" | | SAND CLAY | 140' |
| 152 | | 1.1 | OAK | ¾ | ¼-⅜ | | 38" | | SAND CLAY | 140' |
| 153 | | 1.2 | OAK | ¾ | ¼-⅜ | | 49" | | SAND CLAY | 140' |
| 154 | | 1.2 | OAK | ¾ | ¼-⅜ | | 0" | | SAND CLAY | 140' |
| 155 | | 0.9 | RED OAK | ¾ | ¼-⅜ | | 18" | 1 | SAND CLAY | 140' |
| 156 | | 0.9 | RED OAK | ¾ | ¼-⅜ | | 30" | 1 | SAND CLAY | 140' |
| 157 | | 0.8 | RED OAK | ¾ | ¼-⅜ | | 56" | 1 | SAND CLAY | 140' |
| 158 | | 1.1 | RED OAK | ¾ | ¼-⅜ | | 0" | 1 | SAND CLAY | 140' |
| 159 | | 1.2 | SUGAR MAPLE | ¾ | ¼-⅜ | | 18" | 1 | SAND CLAY | 140' |
| 160 | | 1.2 | SUGAR MAPLE | ¾ | ¼-⅜ | | 25" | 1 | SAND CLAY | 140' |
| 161 | | 1.3 | SUGAR MAPLE | ¾ | ¼-⅜ | | 0" | 1 | SAND CLAY | 140' |
| 162 | | 1.4 | SUGAR MAPLE | ¾ | ¼-⅜ | | 18" | 1 | SAND CLAY | 140' |
| 163 | | 1.2 | BLACK CHERRY | ¾ | ¼-⅜ | | 17" | 1 | SAND CLAY | 140' |
| 164 | | 1.2 | BLACK CHERRY | ¾ | ¼-⅜ | | 25" | 1 | SAND CLAY | 140' |
| 165 | | 1.3 | BLACK CHERRY | ¾ | ¼-⅜ | | 0" | 1 | SAND CLAY | 140' |
| 166 | | 1.4 | BLACK CHERRY | ¾ | ¼-⅜ | | 20" | 12 | SAND CLAY | 140' |
| 167 | | 1.4 | PEAR | ¾ | ¼-⅜ | | 0" | 1 | SAND CLAY | 140' |
| 168 | | 1.1 | PEAR | ¾ | ¼-⅜ | | 18" | 1 | SAND CLAY | 140' |
| 169 | | 1.1 | WILLOW | ¾ | ¼-⅜ | | 27" | 1 | SAND CLAY | 140' |
| 170 | | 1.3 | WILLOW | ¾ | ¼-⅜ | | 0" | 1 | SAND CLAY | 140' |
| 171 | | 1.6 | WILLOW | ¾ | ¼-⅜ | | 18" | 1 | SAND CLAY | 140' |
| 172 | | 1.1 | SPRUCE | ¾ | ¼-⅜ | | 20" | 1 | SAND CLAY | 140' |
| 173 | | 1.1 | BEECH | ¾ | ¼-⅜ | | 30" | 1 | SAND | 40' |
| 174 | | 1.1 | BEECH | ¾ | ¼-⅜ | | 40" | 1 | SAND | 40' |
| 175 | | 1.1 | BEECH | ¾ | ¼-⅜ | | 50" | 1 | SAND | 40' |
| 176 | | 1.0 | BEECH | 3 inch | ¼-⅜ | | 20" | 1 | SAND | 40' |
| 177 | | 1.0 | BEECH | 5 inch | ¼-⅜ | | 20" | 1 | SAND | 40' |
| 178 | | 1.2 | BEECH | staple | ¼-⅜ | | 20" | 1 | SAND | 40' |
| 179 | | 1.0 | ELM | ¾ | ¼-⅜ | | 18" | 1 | SAND | 40' |
| 180 | | 1.0 | ELM | 3 inch | ¼-⅜ | | 36" | 1 | SAND | 40' |
| 181 | | 0.9 | ELM | 5 inch | ¼-⅜ | | 36" | 1 | SAND | 40' |
| 182 | | 1.2 | ELM | staple | ¼-⅜ | | 36" | 1 | SAND | 40' |
| 183 | | 1.1 | BIRCH | ¾ | ¼-⅜ | | 18" | 1 | SAND | 40' |
| 184 | | 1.3 | ELM | ¾ | ¼-⅜ | | 18" | 1 | SAND | 140' |
| 185 | | 1.3 | ELM | ¾ | ¼-⅜ | | 36" | 1 | SAND | 140' |
| 186 | | 1.4 | ELM | ¾ | ¼-⅜ | | 0" | 1 | SAND | 140' |
| 187 | | 1.4 | SPRUCE | ¾" | ¼ to ⅜ | | 18" | 1 | SAND | 140 |
| 188 | | 1.4 | SPRUCE | ¾" | ¼ to ⅜ | | 34" | 1 | SAND | 140 |
| 189 | | 1.5 | SPRUCE | ¾" | ¼ to ⅜ | | 0 | 1 | SAND | 140 |
| 190 | | 1.3 | OAK | ¾" | ¼ to ⅜ | | 18" | 1 | SAND | 140 |

APPENDIX A-continued

POWER SOURCE
DATA COLLECTION

| Test No. | Time Intervals | Voltage DC | Tree Type | Nail Type | Nail Penetration Depth | Nail Diameter | Height from Ground | No. of Nails | Soil Type | Altitude |
|---|---|---|---|---|---|---|---|---|---|---|
| 191 | | 1.3 | OAK | ¾" | ¼ to ⅜ | | 36" | 1 | SAND | 140 |
| 192 | | 1.3 | OAK | ¾" | ¼ to ⅜ | | 48" | 1 | SAND | 140 |
| 193 | | 1.4 | OAK | ¾" | ¼ to ⅜ | | 0 | 1 | SAND | 140 |
| 194 | | 1.3 | APPLE? | ¾" | ¼ to ⅜ | | 18" | 1 | SAND | 140 |
| 195 | | 1.3 | APPLE | ¾" | ¼ to ⅜ | | 30" | 1 | SAND | 140 |
| 196 | | 1.1 | PINE | ¾" | ¼ to ⅜ | | 18" | 1 | SAND | 140 |
| 197 | | 1.1 | PINE | ¾" | ¼ to ⅜ | | 36" | 1 | SAND | 140 |
| 198 | | 1.0 | MAPLE | ¾" | ¼ to ⅜ | | 18" | 1 | SAND | 40 |
| 199 | | 1.0 | MAPLE | ¾" | ¼ to ⅜ | | 36" | 1 | SAND | 40 |
| 200 | | 1.2 | BLACK CHERRY | ¾" | ¼ to ⅜ | | 12" | 1 | SAND | 40 |
| 201 | | 1.2 | BLACK CHERRY | ¾" | ¼ to ⅜ | | 20" | 1 | SAND | 40 |
| 202 | | 1.2 | BLACK CHERRY | ¾" | ¼ to ⅜ | | 48" | 1 | SAND | 40 |
| 203 | | 1.3 | BLACK CHERRY | ¾" | ¼ to ⅜ | | 0 | 1 | SAND | 40 |
| 204 | | 1.1 | LILAC | ¾" | ¼ to ⅜ | | 14" | 1 | SAND | 40 |
| 205 | | 1.1 | LILAC | ¾" | ¼ to ⅜ | | 22" | 1 | SAND | 40 |
| 206 | | 1.1 | LILAC | ¾" | ¼ to ⅜ | | 40" | 1 | SAND | 40 |
| 207 | | 1.1 | ELM | ¾" | ¼ to ⅜ | | 18" | 1 | SAND | 40 |
| 208 | | 1.1 | ELM | ¾" | ¼ to ⅜ | | 36" | 1 | SAND | 40 |
| 209 | | 1.1 | ELM | ¾" | ¼ to ⅜ | | 50" | 1 | SAND | 40 |
| 210 | | 1.3 | SPRUCE | ¾" | ¼ to ⅜ | | 18" | 1 | SAND | 40 |
| 211 | | 1.3 | SPRUCE | ¾" | ¼ to ⅜ | | 30" | 1 | SAND | 40 |
| 212 | | 1.3 | SPRUCE | ¾" | ¼ to ⅜ | | 50" | 1 | SAND | 40 |
| 213 | | 1.3 | SPRUCE | ¾" | ¼ to ⅜ | | 74" | 1 | SAND | 40 |
| 214 | | -1.2 | ELM | ¾" | ¼ to ⅜ | | 20" | 8 | SAND | 40 |
| 215 | | -1.2 | ELM | ¾" | ¼ to ⅜ | | 36" | 1 | SAND | 40 |
| 216 | | -1.3 | ELM | ¾" | ¼ to ⅜ | | 0 | 1 | SAND | 40 |
| 217 | | -1.1 | MAPLE | ¾" | ¼ to ⅜ | | 18" | 1 | SAND | 40 |
| 218 | | -1.3 | APPLE | ¾" | ¼ to ⅜ | | 14" | 1 | SAND | 40 |
| 219 | | -1.3 | APPLE | ¾" | ¼ to ⅜ | | 25" | 1 | SAND | 40 |
| 220 | | -1.3 | APPLE | ¾" | ¼ to ⅜ | | 50" | 1 | SAND | 40 |
| 221 | | -1.4 | SPRUCE | ¾" | ¼ to ⅜ | | 14" | 1 | SAND | 40 |
| 222 | | -1.4 | SPRUCE | ¾" | ¼ to ⅜ | | 22" | 1 | SAND | 40 |
| 223 | | -1.4 | SPRUCE | ¾" | ¼ to ⅜ | | 36" | 1 | SAND | 40 |
| 224 | | -1.1 | MAPLE | ¾" | ¼ to ⅜ | | 18" | 1 | SAND | 40 |
| 225 | | -1.1 | MAPLE | ¾" | ¼ to ⅜ | | 36" | 1 | SAND | 40 |
| 226 | | -1.0 | ELM | ¾" | ¼ to ⅜ | | 20" | 1 | SAND | 40 |
| 227 | | -1.0 | ELM | ¾" | ¼ to ⅜ | | 40" | 1 | SAND | 40 |
| 228 | | -1.0 | ELM | ¾" | ¼ to ⅜ | | 50" | 1 | SAND | 40 |
| 229 | | -1.2 | BEECH | ¾" | ¼ to ⅜ | | 18" | 1 | SAND | 40 |
| 230 | | -1.2 | BEECH | ¾" | ¼ to ⅜ | | 24" | 1 | SAND | 40 |
| 231 | | -1.2 | BEECH | ¾" | ¼ to ⅜ | | 38" | 1 | SAND | 40 |
| 232 | | -1.3 | OAK | ¾" | ¼ to ⅜ | | 16" | 1 | SAND | 40 |
| 233 | | -1.3 | OAK | ¾" | ¼ to ⅜ | | 28" | 1 | SAND | 40 |
| 234 | | -1.3 | OAK | ¾" | ¼ to ⅜ | | 38" | 1 | SAND | 40 |
| 235 | | -1.4 | OAK | ¾" | ¼ to ⅜ | | 0 | 1 | SAND | 40 |
| 236 | | -1.2 | BIRCH | ¾" | ¼ to ⅜ | | 18" | 1 | SAND | 40 |
| 237 | | -1.3 | BIRCH | ¾" | ¼ to ⅜ | | 30" | 1 | SAND | 40 |
| 238 | | -1.3 | BIRCH | ¾" | ¼ to ⅜ | | 44" | 1 | SAND | 40 |
| 239 | | -1.2 | BIRCH | ¾" | ¼ to ⅜ | | 0 | 1 | SAND | 40 |
| 240 | | -1.1 | POPLAR | ¾" | ¼ to ⅜ | | 18" | 1 | SAND | 40 |
| 241 | | -1.1 | POPLAR | ¾" | ¼ to ⅜ | | 24" | 1 | SAND | 40 |
| 242 | | -1.2 | POPLAR | ¾" | ¼ to ⅜ | | 36" | 1 | SAND | 40 |
| 243 | | -1.2 | POPLAR | ¾" | ¼ to ⅜ | | 48" | 1 | SAND | 40 |
| 244 | | -1.1 | ELM | ¾" | ¼ to ⅜ | | 18" | 1 | SAND | 40 |
| 245 | | -1.1 | ELM | ¾" | ¼ to ⅜ | | 28" | 1 | SAND | 40 |
| 246 | | -1.2 | BLACKBERRY | ¾" | ¼ to ⅜ | | ?10"? | 1 | SAND | 40 |
| 247 | | -1.2 | BLACKBERRY | ¾" | ¼ to ⅜ | | 16" | 1 | SAND | 40 |
| 248 | | -0.9 | WILLOW | ¾" | ¼ to ⅜ | | 12" | 1 | SAND | 40 |
| 249 | | -1.0 | WILLOW | ¾" | ¼ to ⅜ | | 20" | 1 | SAND | 40 |
| 250 | | -1.1 | WILLOW | ¾" | ¼ to ⅜ | | 0 | 1 | SAND | 40 |
| 251 | | -0.8 | BROCOLLI | ¾" | ¼ to ⅜ | | 8" | 1 | SAND | 40 |
| 252 | | -0.7 | BROCOLLI | ¾" | ¼ to ⅜ | | LEAF | 1 | SAND | 40 |
| 253 | | -1.1 | ELM | ¾" | ¼ to ⅜ | | 14" | 1 | SAND | 40 |
| 254 | | -1.1 | ELM | ¾" | ¼ to ⅜ | | 20" | 1 | SAND | 40 |
| 255 | | -1.0 | ELM | ¾" | ¼ to ⅜ | | 18" | 1 | SAND | 40 |
| 256 | | -1.0 | ELM | ¾" | ¼ to ⅜ | | 36" | 1 | SAND | 40 |
| 257 | | -1.1 | WALNUT | ¾" | ¼ to ⅜ | | 18" | 1 | SAND | 40 |
| 258 | | -0.3 | WALNUT | ¾" | ¼ to ⅜ | | 18" | 1 | SAND | 40 |
| 259 | | -0.4 | PINE | ¾" | ¼ to ⅜ | | 16" | 1 | SAND | 40 |
| 260 | | -0.9 | PINE | ¾" | ¼ to ⅜ | | 0 | 1 | SAND | 40 |
| 261 | | -1.2 | PINE | ¾" | ¼ to ⅜ | | 20" | 1 | SAND | 40 |
| 262 | | -1.2 | PINE | ¾" | ¼ to ⅜ | | 40" | 1 | SAND | 40 |

APPENDIX A-continued

POWER SOURCE
DATA COLLECTION

| Test No. | Time Intervals | Voltage DC | Tree Type | Nail Type | Nail Penetration Depth | Nail Diameter | Height from Ground | No. of Nails | Soil Type | Altitude |
|---|---|---|---|---|---|---|---|---|---|---|
| 263 | | −1.3 | PINE | ¾" | ¼ to ⅜ | | 0 | 1 | SAND | 40 |
| 264 | | −1.1 | LILAC | ¾" | ¼ to ⅜ | | 12" | 1 | SAND | 40 |
| 265 | | −1.1 | LILAC | ¾" | ¼ to ⅜ | | 18" | 1 | SAND | 40 |
| 266 | | −1.0 | MAPLE | ¾" | ¼ to ⅜ | | 2" | 1 | SAND | 40 |
| 267 | | −1.0 | MAPLE | ¾" | ¼ to ⅜ | | 0 | 1 | SAND | 40 |
| 268 | | −1.1 | PINE | ¾" | ¼ to ⅜ | | 18" | 1 | SAND | 40 |
| 269 | | −1.0 | PINE | ¾" | ¼ to ⅜ | | 32" | 1 | SAND | 40 |
| 270 | | −1.3 | LEMON | ¾" | ¼ to ⅜ | | 18" | 1 | SAND | 40 |
| 271 | | −0.9 | TOMATO | ¾" | ¼ to ⅜ | | 6" | 1 | SAND | 40 |
| 272 | | −0.8 | CAULIFLOWER | ¾" | ¼ to ⅜ | | 2" | 1 | SAND | 40 |
| 273 | | 0.0 | GRASS | ¾" | ¼ to ⅜ | | 0 | Alligator clip | SAND | 40 |
| 274 | | −1.1 | PINE | ¾" | ¼ to ⅜ | | 16" | 1 | SAND | 40 |
| 275 | | −1.1 | MAPLE | ¾" | ¼ to ⅜ | | 15" | 1 | SAND | 40 |
| 276 | | −1.1 | MAPLE | ¾" | ¼ to ⅜ | | 28" | 1 | SAND | 40 |
| 277 | | −1.0 | MAPLE | ¾" | ¼ to ⅜ | | 36" | 1 | SAND | 40 |
| 278 | | −1.0 | ELM | ¾" | ¼ to ⅜ | | 25" | 1 | SAND | 40 |
| 279 | | −1.1 | ELM | ¾" | ¼ to ⅜ | | 35" | 1 | SAND | 40 |
| 280 | | −0.9 | MAPLE | ¾" | ¼ to ⅜ | | 18" | 1 | SAND | 40 |
| 281 | | −1.0 | MAPLE | ¾" | ¼ to ⅜ | | 36" | 1 | SAND | 40 |
| 282 | | −1.0 | CEDAR | ¾" | ¼ to ⅜ | | 18" | 1 | SAND | 40 |
| 283 | | −1.1 | CEDAR | ¾" | ¼ to ⅜ | | 30" | 1 | SAND | 40 |
| 284 | | −1.0 | BASSWOOD | ¾" | ¼ to ⅜ | | 20" | 1 | SAND | 40 |
| 285 | | −1.0 | BASSWOOD | ¾" | ¼ to ⅜ | | 36" | 1 | SAND | 40 |
| 286 | | −1.0 | BASSWOOD | ¾" | ¼ to ⅜ | | 48" | 1 | SAND | 40 |
| 287 | | −1.0 | BASSWOOD | ¾" | ¼ to ⅜ | | 65" | 1 | SAND | 40 |
| 290 | | 0.0 | TELE POLE | ¾" | ¼ to ⅜ | | 24" | 1 | SAND | 40 |
| 291 | | −0.9 | LILAC | ¾" | ¼ to ⅜ | | 16" | 1 | SAND | 40 |
| 293 | | −1.4 | SPRUCE | ¾" | ¼ to ⅜ | | 18" | 1 | SAND | 40 |
| 294 | | −1.4 | SPRUCE | ¾" | ¼ to ⅜ | | 28" | 1 | SAND | 40 |
| 295 | | −1.3 | SPRUCE | ¾" | ¼ to ⅜ | | 40" | 1 | SAND | 40 |
| 296 | | −1.1 | ELM | ¾" | ¼ to ⅜ | | 16" | 1 | SAND | 40 |
| 297 | | −1.2 | APPLE | ¾" | ¼ to ⅜ | | 16" | 1 | SAND | 40 |
| 298 | | −1.2 | APPLE | ¾" | ¼ to ⅜ | | 24" | 1 | SAND | 40 |
| 299 | | −1.1 | MAPLE | ¾" | ¼ to ⅜ | | 18" | 1 | SAND | 40 |
| 300 | | −1.1 | MAPLE | ¾" | ¼ to ⅜ | | 30" | 1 | SAND | 40 |
| 301 | | −1.2 | MAPLE | ¾" | ¼ to ⅜ | | 0 | 1 | SAND | 40 |
| 302 | | −1.2 | APPLE | ¾" | ¼ to ⅜ | | 16" | 1 | SAND | 40 |
| 303 | | −1.2 | APPLE BROCCOLI | ¾" | ¼ to ⅜ | | | 1 | SAND | 40 |
| 304 | | −1.2 | APPLE BROCCOLI | ¾" | ¼ to ⅜ | | | 1 | SAND | 40 |
| 305 | | −1.2 | APPLE BROCCOLI | ¾" | ¼ to ⅜ | | | 1 | SAND | 40 |

What is claimed is:

1. A system comprising:
a non-animal organism;
a first electrical conductor electrically coupled to the non-animal organism;
a second electrical conductor coupled to a ground; and
an electrical load coupled between the first electrical conductor and the second electrical conductor to draw electricity from the non-animal organism, the electrical load being configured to operate using electricity drawn from the non-animal organism.

2. The system of claim 1 further comprising a charging circuit coupled to the electrical load, the charging circuit including an energy storage device, the charging circuit being configured store energy drawn from the non-animal organism and to provide the energy to the electrical load.

3. The system of claim 2 wherein the electrical storage device is a capacitor.

4. The system of claim 2 wherein the electrical storage device is a battery.

5. The system of claim 2 further comprising a filter circuit configured to filter the electricity drawn from the non-animal organism to produce filtered electricity, and to provide the filtered electricity to the charging circuit.

6. The system of claim 1 further comprising a filter circuit configured to filter the electricity drawn from the non-animal organism to produce filtered electricity, and to provide the filtered electricity to the electrical load.

7. The system of claim 1 wherein the non-animal organism is a member of the plant kingdom.

8. The system of claim 7 wherein the non-animal organism is a tree.

9. The system of claim 1 wherein the non-animal organism is a member of the fungi kingdom.

10. The system of claim 1 wherein the first electrical conductor is a configured to be inserted into the non-animal organism.

11. The system of claim 10 wherein the first electrical conductor is configured to be inserted into the non-animal organism to a depth of from about 0.25 inches to about 0.75 inches.

12. The system of claim 10 wherein the first electrical conductor comprises stainless steel.

13. The system of claim 10 wherein the first electrical conductor comprises aluminum.

14. The system of claim 1 wherein the first electrical conductor comprises a plurality of electrically conductive taps coupled to the non-animal organism.

15. The system of claim 14 wherein the non-animal organism comprises a single tree.

16. The system of claim 14 wherein the non-animal organism comprises multiple trees.

17. The system of claim 1 wherein the electrical load is a light emitting diode.

18. A method for drawing electricity from a non-animal organism, the method comprising:
coupling a first electrical conductor to the non-animal organism;
coupling a second electrical conductor to a ground;
coupling an electrical load between the first electrical conductor and the second electrical conductor, the electrical load being configured to draw electricity from the non-animal organism via the first electrical conductor; and
operating the electrical load using electricity drawn from the non-animal organism.

19. The method of claim 18 further comprising:
storing energy drawn from the non-animal organism in an electrical storage device; and
providing the stored energy to the electrical load.

20. The method of claim 19 wherein providing the stored energy comprises intermittently providing power to the electrical load.

21. The method of claim 19 further comprising:
filtering power drawn from the non-animal organism into substantially DC power; and
providing the filtered substantially DC power to the electrical storage device.

22. The method of claim 18 further comprising:
filtering power drawn from the non-animal organism into substantially DC power; and
providing the filtered substantially DC power to the electrical load.

23. The method of claim 18 wherein coupling the first electrical conductor comprises coupling the first electrical conductor to a living member of the plant kingdom.

24. The method of claim 23 wherein coupling the first electrical conductor comprises coupling the first electrical conductor to a living tree.

25. The method of claim 18 wherein coupling the first electrical conductor comprises coupling the first electrical conductor to a living member of the fungi kingdom.

26. The method of claim 18 wherein coupling the first electrical conductor to the non-animal organism comprises coupling a plurality of electrically conductive taps to a single living plant or a single living fungus.

27. The method of claim 18 wherein coupling the first electrical conductor to the non-animal organism comprises coupling a plurality of electrically conductive taps to multiple separate living non-animal organisms, each non-animal organism being a plant or a fungus.

28. The method of claim 18 wherein operating the electrical load comprises operating a light emitting diode using the electricity drawn from the non-animal organism.

* * * * *